(12) United States Patent
Dufau

(10) Patent No.: US 10,953,554 B2
(45) Date of Patent: Mar. 23, 2021

(54) ARTICULATED ROBOT ARM

(71) Applicant: Ludovic Dufau, Talence (FR)

(72) Inventor: Ludovic Dufau, Talence (FR)

(73) Assignee: NIMBL'BOT SAS, Talence (FR)

( * ) Notice: Subject to any disclaimer, the term of this patent is extended or adjusted under 35 U.S.C. 154(b) by 0 days.

(21) Appl. No.: 15/754,169

(22) PCT Filed: Jul. 12, 2016

(86) PCT No.: PCT/FR2016/051795
§ 371 (c)(1),
(2) Date: Feb. 21, 2018

(87) PCT Pub. No.: WO2017/032932
PCT Pub. Date: Mar. 2, 2017

(65) Prior Publication Data
US 2018/0243927 A1  Aug. 30, 2018

(30) Foreign Application Priority Data

Aug. 21, 2015  (FR) .................................... 15/57849

(51) Int. Cl.
    *B25J 9/06*      (2006.01)
    *B25J 17/02*     (2006.01)
    *B25J 9/10*      (2006.01)
    *F16C 19/16*     (2006.01)
    *F16C 19/36*     (2006.01)

(52) U.S. Cl.
    CPC ............. *B25J 17/0275* (2013.01); *B25J 9/06* (2013.01); *B25J 9/1045* (2013.01); *B25J 17/025* (2013.01); *B25J 17/0291* (2013.01); *F16C 19/16* (2013.01); *F16C 19/36* (2013.01);

*F16C 2380/00* (2013.01); *Y10S 901/23* (2013.01); *Y10S 901/25* (2013.01); *Y10S 901/28* (2013.01)

(58) Field of Classification Search
    CPC ...... B25J 17/0291; B25J 17/0275; B25J 9/06; B25J 9/065; B25J 9/106; B25J 9/108; B25J 9/126
    USPC ......... 901/15, 23, 25, 28; 74/490.01, 490.03
    See application file for complete search history.

(56) References Cited

U.S. PATENT DOCUMENTS 3,216,768 A * 11/1965 Soeding ................ F04C 13/004
                                                            417/203
4,662,815 A *  5/1987 Zimmer ............... B25J 17/0291
                                                            414/735

(Continued)

FOREIGN PATENT DOCUMENTS

CA    2773839 A1    9/2013
CA    2807287 A1    8/2014

OTHER PUBLICATIONS

International Search Report for Application No. PCT/FR2016/051795.

*Primary Examiner* — Bobby Rushing, Jr.
(74) *Attorney, Agent, or Firm* — Cantor Colburn LLP

(57) ABSTRACT

The invention relates to an articulated robot arm (1) which comprises a plurality of trapezoidal truncated cylinders (2) disposed in succession around an internal holding member (4), each trapezoidal truncated cylinder (2) being configured to pivot about the internal holding member (4), the internal holding member (4) having angular control means for controlling the rotation of each trapezoidal truncated cylinder (2).

14 Claims, 2 Drawing Sheets

(56) References Cited

U.S. PATENT DOCUMENTS

| | | | | |
|---|---|---|---|---|
| 4,683,406 A | * | 7/1987 | Ikeda | B25J 17/0258 |
| | | | | 318/568.2 |
| 4,690,012 A | * | 9/1987 | Dahlquist | B25J 17/0291 |
| | | | | 74/417 |
| 4,771,652 A | * | 9/1988 | Zimmer | B25J 17/0291 |
| | | | | 74/469 |
| 4,997,413 A | * | 3/1991 | Dahlquist | B25J 17/025 |
| | | | | 475/163 |
| 5,313,838 A | * | 5/1994 | Gondard | G01N 29/265 |
| | | | | 324/220 |
| 5,860,327 A | * | 1/1999 | Stanev | B25J 9/02 |
| | | | | 248/371 |
| 6,408,224 B1 | * | 6/2002 | Okamoto | B25J 9/1661 |
| | | | | 29/721 |
| 6,976,401 B2 | * | 12/2005 | Okamoto | B25J 17/0291 |
| | | | | 74/490.02 |
| 6,978,193 B2 | * | 12/2005 | Kamon | B25J 9/1653 |
| | | | | 318/568.1 |
| 7,971,504 B2 | * | 7/2011 | Haniya | B25J 9/0087 |
| | | | | 74/490.03 |
| 8,069,747 B2 | * | 12/2011 | Buckingham | B25J 9/06 |
| | | | | 74/490.04 |
| 9,550,299 B2 | | 1/2017 | Wolf et al. | |
| 2004/0149064 A1 | * | 8/2004 | Narita | B25J 17/025 |
| | | | | 74/490.03 |
| 2015/0047452 A1 | * | 2/2015 | Wolf | B25J 17/0275 |
| | | | | 74/490.05 |
| 2015/0322946 A1 | * | 11/2015 | Krampe | F04C 2/1071 |
| | | | | 418/182 |
| 2016/0008989 A1 | * | 1/2016 | Bakir | B25J 9/102 |
| | | | | 74/490.03 |

\* cited by examiner

ARTICULATED ROBOT ARM

CROSS REFERENCE TO RELATED APPLICATIONS

This application is a National Stage of PCT Application No. PCT/FR2016/051795 filed on Jul. 12, 2016, which claims priority to French Patent Application No. 15/57849 filed on Aug. 21, 2015, the contents each of which are incorporated herein by reference thereto.

TECHNICAL FIELD

The present invention concerns an articulated robot arm.

BACKGROUND

The industrial robots are used to quickly and accurately perform a very wide range of industrial tasks.

Traditionally, the articulations of the industrial robot arms have several segments pivoting relative to each other.

Each pivot link has an independent motorization. Most often, the motors of the pivots of the robot arms are powered by electrical or pneumatic connections positioned outside the robot arm. These connections hinder the rotations of the robot arm and increase the bulk and the collision risks with the external environment.

BRIEF SUMMARY

Consequently, the object of the present invention is to propose an articulated robot arm having a reduced bulk and being able to perform displacements covering a high solid angle.

According to a general definition, the invention concerns an articulated robot arm which comprises a plurality of trapezoidal truncated cylinders disposed in series about an inner holding member. Each trapezoidal truncated cylinder is configured to pivot about the inner holding member. The inner holding member has angular drive means allowing to control the rotation of each trapezoidal truncated cylinder.

It is specified that, in the present document, the term trapezoidal truncated cylinder means a cylinder portion with at least one circular section inclined with respect to the axis of revolution of the cylinder.

The rotation of the trapezoidal truncated cylinders allows the robot arm to describe complex trajectories in space and to cover a high solid angle. In addition, the angular drive means, associated to the trapezoidal truncated cylinders, allow the robot arm to perform precise displacements. Furthermore, advantageously, the inner holding member and the angular drive means are positioned in the truncated cylinders. Thus, the robot arm according to the invention has a reduced bulk and may perform displacements covering a high solid angle.

The inner holding member may comprise a cable connected to means for tensioning the cable. The tension of the cable may allow exerting a compression force on the robot arm.

Thus, the cable may allow pre-stressing the robot arm, in order to hold the trapezoidal truncated cylinders in contact during, for example, the transport of a load.

The angular drive means may comprise at least one gear wheel adapted to cooperate with a ring gear positioned in a corresponding trapezoidal truncated cylinder.

The use of a gear wheel and of a ring gear allows precisely controlling the rotation of each trapezoidal truncated cylinder.

The angular drive means may comprise at least one motor having a stator linked to the inner holding member and a rotor configured to drive in rotation the gear wheel.

The connection of the stator of the motor to the inner holding member advantageously allows the connections of the motor to route inside the robot arm. This technical arrangement allows reducing the bulk of the robot arm and allows the robot arm to move without being hindered by external connections.

According to a particular arrangement, the rotor may have a worm screw configured to drive in rotation the gear wheel.

The worm screw allows driving precisely the rotation of the trapezoidal truncated cylinder to which it is associated. Furthermore, the irreversibility of the connection between the worm screw and the gear wheel allows guaranteeing the holding in position of the robot arm. This arrangement may therefore allow increasing the safety of the robot arm.

According to another arrangement, the rotor may be connected to a gear reduction device configured to drive in rotation the gear wheel.

The inner holding member may comprise a plurality of segments (41) articulated relative to each other.

Furthermore, the inner holding member may comprise several cardan joints each positioned between two segments to allow the articulation of the segments relative to each other.

The robot arm may comprise bearing means positioned between each trapezoidal truncated cylinder, to allow the rotation of the trapezoidal truncated cylinders relative to each other.

According to a particular arrangement, the bearing means may comprise at least one ball.

According to a particular arrangement, the bearing means may comprise at least one cylindrical roller.

The robot arm may comprise at least one force measuring device connected to the cable configured to measure a mechanical force applied to the cable.

The force measuring device allows optimizing the driving of the robot arm and to increase the safety thereof.

According to a particular arrangement, the gear wheel and the ring gear may each have straight teeth.

According to a particular arrangement, the gear wheel and the ring gear may each have conical teeth.

According to a particular arrangement, the robot arm may comprise an even number of truncated cylinders.

BRIEF DESCRIPTION OF THE DRAWINGS

For the good understanding thereof, the invention is described with reference to the appended drawings which represent by way of non-limiting example an embodiment of a robot arm according thereto.

DETAILED DESCRIPTION

Figure 1:
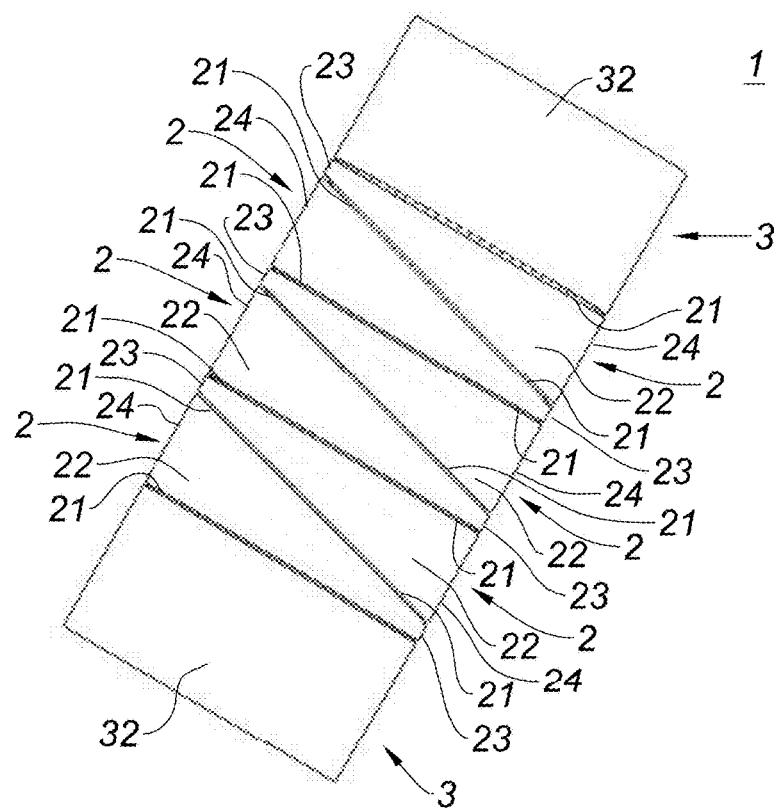
FIG. 1 is a front view of a robot arm according to the invention.

The invention concerns an articulated robot arm 1 shown in FIGS. 1 to 4.

The robot arm 1 essentially comprises a plurality of trapezoidal truncated cylinders 2 disposed in series about an inner holding member 4. According to the embodiment presented here, the robot arm 1 comprises an even number of trapezoidal truncated cylinders 2. Each trapezoidal truncated cylinder 2 is configured to pivot about the inner holding member 4. The inner holding member 4 has angular drive means allowing to control the rotation of trapezoidal truncated cylinder 2.

Each trapezoidal truncated cylinder 2 has two circular sections 21 connected together by a wall 22.

The wall 22 has a small height 23 and a great height 24. The great height 24 has a side greater than the side of the small height 23.

Furthermore, according to the embodiment presented here, the trapezoidal truncated cylinders 2 have a rectangular trapezium geometry. Thus, one of the two circular sections 21, of each trapezoidal truncated cylinder 2, is substantially perpendicular to the wall 22.

According to the embodiment presented here, the trapezoidal truncated cylinders 2 are positioned in pairs, such that their circular sections 21 substantially perpendicular to a corresponding wall 22 are juxtaposed to each other.

Each trapezoidal truncated cylinder 2 has a ring gear 28 positioned against the wall 22, inside the trapezoidal truncated cylinder 2.

According to the embodiment presented here, the ring gear 28 have straight teeth.

Each trapezoidal truncated cylinder 2 can, for example, be made of a molded then machined metal.

Figure 2:
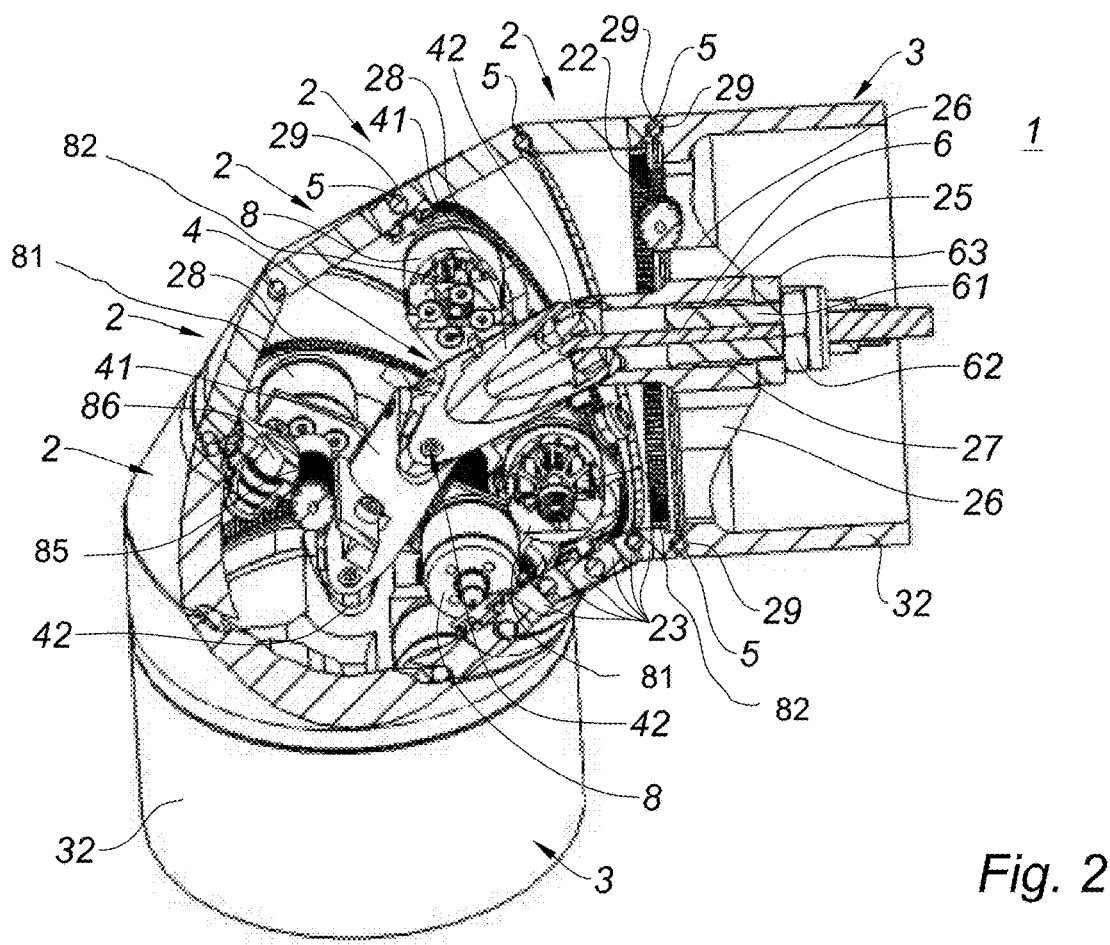
FIG. 2 is a partial sectional view, in perspective, of a robot arm according to the invention.
Figure 3:
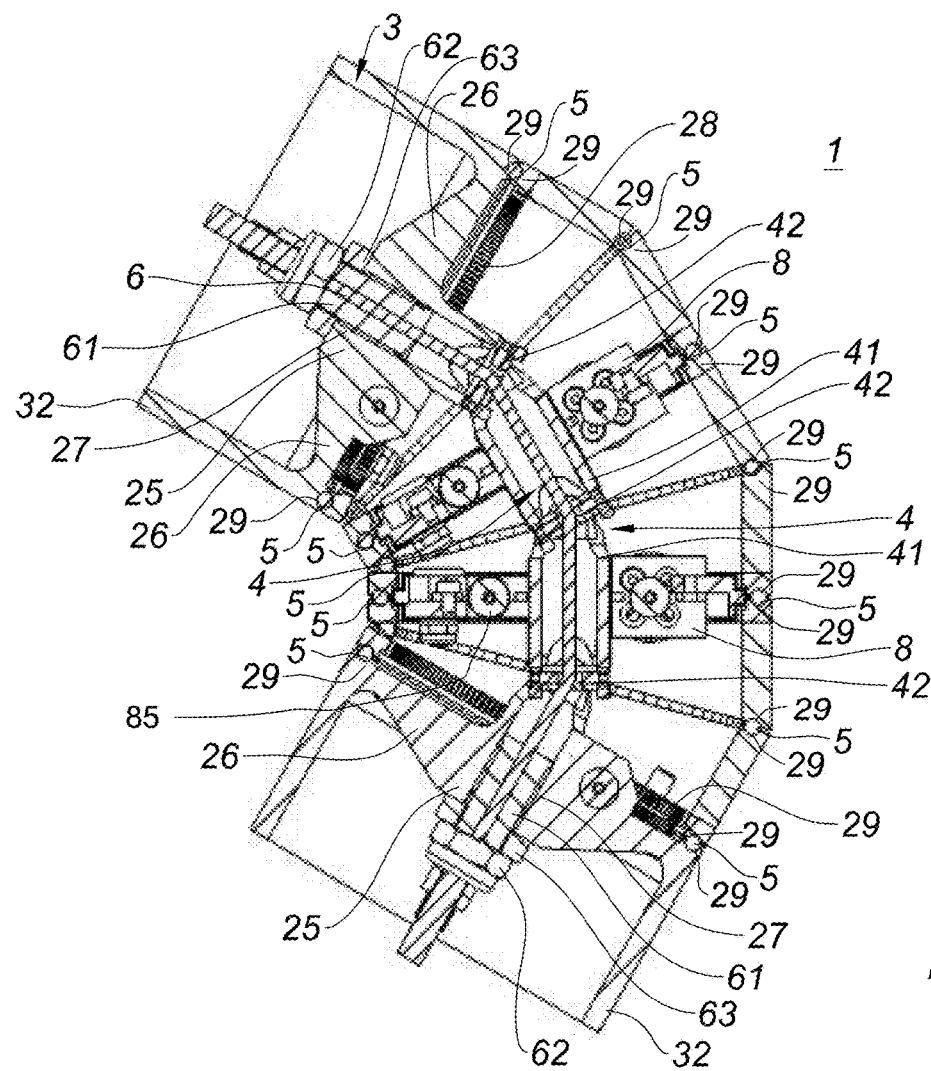
FIG. 3 is a front sectional view, of a robot arm according to the invention.
Figure 4:
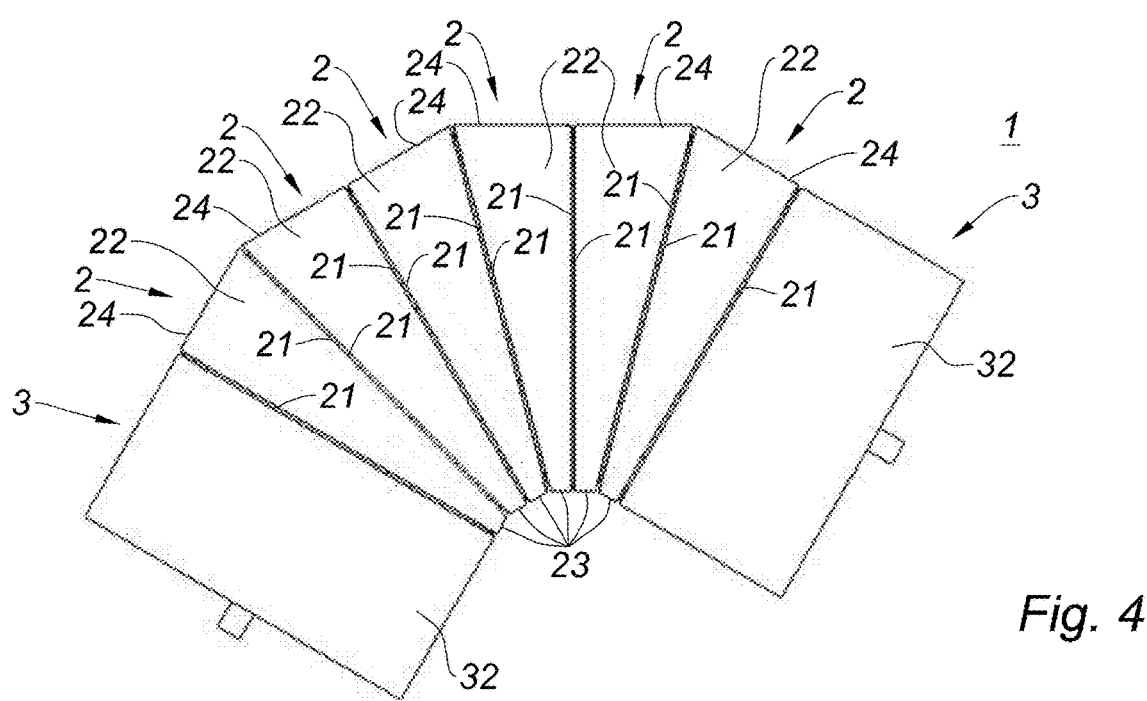
FIG. 4 is a front view of a robot arm according to the invention, defining a bend.

Furthermore, as shown in FIGS. 2 and 3, an end truncated cylinder 3 is positioned at each end of the robot arm 1. The end truncated cylinders 3 comprise a central hub 25 connected to an outer wall 32 through four ribs 26. The central hub 25 has a bore 27. The central hub 25 has a substantially flat first end, intended to serve as a stop for a washer 63 and a nut 62 which will be presented subsequently. A second end of the central hub has a yoke configured to receive a cross to form a cardan joint 42 with the inner holding member 4.

In use, one of the end truncated cylinders 3 may be provided with a tool, as for example, a clamp, a welding, machining or cutting device.

With reference to FIGS. 2 and 3, each circular section 21 may have a groove 29.

According to the example presented here, the groove 29 is designed to receive balls 5. However, according to another embodiment, the groove 29 may, for example, accommodate rollers.

As seen in FIGS. 2 and 3, each ball 5 is at the interface between two grooves 29, thus defining a bearing between two trapezoidal truncated cylinders 2. In other words, the balls 5 allow the trapezoidal truncated cylinders 2 to pivot relative to each other.

The robot arm 1 also comprises an inner holding member 4, shown in FIGS. 2 and 3.

According to the embodiment presented here, the inner holding member 4 comprises a plurality of segments 41 connected in pairs by cardan joints 42.

Furthermore, each end of the inner holding member 4 is linked by a cardan joint 42 to the central hub 25 of a corresponding end truncated cylinder 3.

As seen in FIGS. 2 and 3, a cable 6 passes through the inner holding member 4 and the bores 27 of the end truncated cylinders 3.

According to the embodiment presented here, the cable 6 may, for example, be made of steel. Furthermore, the cable 6 may be sized to break during exercising a predetermined mechanical force.

In addition, as shown in FIG. 3, each of the two ends of the cable 6 is provided with a tensioning barrel 61 positioned in the bore 27. The tensioning barrel 61 is associated with a nut 62 and a washer 63 positioned in abutment on the first end of the central hub 25. As will be developed subsequently, the nut 62 and the tensioning barrel 61 allow adjusting the tension of the cable 6.

A force measuring device (e.g., washer 63) is connected to the cable 6.

The angular positioning means comprise in particular motors 8 shown in FIGS. 2 and 3.

The stator 81 of each motor 8 is fastened to any of the segments 41 of the inner holding member 4.

According to the embodiment presented here, the rotor 82 of each motor 8 is linked to a worm screw 85. The worm screw 85 is configured to drive in rotation a gear wheel 86. The gear wheel 86 is meshed with the ring gear 28 of a corresponding trapezoidal truncated cylinder 2, for controlling the rotation of the trapezoidal truncated cylinder 2.

According to the embodiment presented here, the gear wheel 86 has two stages, a first stage with straight teeth designed to be meshed with the ring gear 28, and a second stage with helical teeth designed to be meshed with the worm screw 85.

FIGS. 1 to 4 allow appreciating the operation of the robot arm 1.

In use, the tension of the cable 6 is adjusted to pre-stress the robot arm 1, to hold the trapezoidal truncated cylinders 2 in contact with each other, for example, when carrying heavy loads.

It is specified that the present description starts from a situation in which the robot arm 1 is in a substantially rectilinear position shown in FIG. 1.

In a substantially rectilinear position, the trapezoidal truncated cylinders are oriented such that the small height 23 of each trapezoidal truncated cylinder 2 is juxtaposed at the great height 24 of the adjacent trapezoidal truncated cylinder 2.

The start-up of a motor 8 allows the rotation of a corresponding trapezoidal truncated cylinder 2. In a particularly advantageous manner, the connection between the worm screw 85, the gear wheel 86 and the ring gear 28 allows precisely controlling the rotation of each trapezoidal truncated cylinder 2. Furthermore, the connection between the worm screw 85 and the gear wheel 86 guaranteeing the blocking in position of each trapezoidal truncated cylinder 2.

The motors 8 allow controlling independently the rotation of the trapezoidal truncated cylinders 2, which allows the robot arm 1 to cover a high solid angle. Thus, the passage of the robot arm 1 from a substantially rectilinear position shown in FIG. 1 to a substantially angled position shown in FIG. 4, requires the rotation of some trapezoidal truncated cylinders 2. In the position shown in FIG. 4, the trapezoidal truncated cylinders 2 are oriented such that the small heights 23 of the adjacent trapezoidal truncated cylinders 2 are juxtaposed to each other.

Thus, the invention proposes a robot arm 1 which has a reduced bulk and which may perform displacements covering a high solid angle.

Of course, the invention is not limited to the single embodiment shown above, but it encompasses on the contrary all the embodiments.

The invention claimed is:

1. An articulated robot arm, comprising:
a plurality of trapezoidal truncated cylinders disposed in series about an inner holding member, the inner holding member being centrally located in each of the plurality of trapezoidal truncated cylinders and comprising a plurality of segments articulated relative to each other;
a cable extending through the plurality of segments;
a pair of end truncated cylinders located on opposite ends of the plurality of trapezoidal truncated cylinders, each one of the plurality of trapezoidal truncated cylinders having a circular section located on each end with a groove;
a ball located or at least one cylindrical roller located between the grooves of each one of the plurality of trapezoidal truncated cylinders, each one of the plurality of trapezoidal truncated cylinders being configured to pivot about the inner holding member; and
a drive mechanism for each one of the plurality of trapezoidal truncated cylinders, the drive mechanism controls the rotation of each one of the plurality of trapezoidal truncated cylinders about the inner holding member, the drive mechanism being fastened to the inner holding member at one end and operably coupled to an inner surface of a respective one of the plurality of trapezoidal truncated cylinders at an opposite end, wherein the cable is connected to means for tensioning the cable, the tension of the cable exerting a compression force on the robot arm.

2. The robot arm according to claim 1, wherein the drive mechanism includes at least one gear wheel adapted to cooperate with a ring gear positioned in a corresponding trapezoidal truncated cylinder.

3. The robot arm according to claim 2, wherein the drive mechanism includes at least one motor having a stator secured to the inner holding member and a rotor configured to drive in rotation the gear wheel.

4. The robot arm according to claim 3, wherein the rotor has a worm screw configured to drive in rotation the gear wheel.

5. The robot arm according to claim 3, wherein the rotor is connected to a gear reduction device configured to drive in rotation the gear wheel.

6. The robot arm according to claim 1, wherein the inner holding member comprises several cardan joints each positioned between two segments to allow the articulation of the segments relative to each other.

7. The robot arm according to claim 1, further comprising at least one force measuring device connected to the cable configured to measure a mechanical force applied to the cable.

8. The robot arm according to claim 1 wherein the drive mechanism includes at least one gear wheel adapted to cooperate with a ring gear positioned in a corresponding trapezoidal truncated cylinder.

9. An articulated robot arm, comprising:
a plurality of trapezoidal truncated cylinders disposed in series about an inner holding member, the inner holding member being centrally located in each of the plurality of trapezoidal truncated cylinders and comprising a plurality of segments articulated relative to each other;
a cable extending through the plurality of segments;
a pair of end truncated cylinders located on opposite ends of the plurality of trapezoidal truncated cylinders, each one of the plurality of trapezoidal truncated cylinders having a circular section located on each end with a groove;
a ball located or at least one cylindrical roller located between the grooves of each one of the plurality of trapezoidal truncated cylinders, each one of the plurality of trapezoidal truncated cylinders being configured to pivot about the inner holding member; and
a drive mechanism for each one of the plurality of trapezoidal truncated cylinders, the drive mechanism controls the rotation of each one of the plurality of trapezoidal truncated cylinders about the inner holding member, the drive mechanism being fastened to the inner holding member at one end and operably coupled to an inner surface of a respective one of the plurality of trapezoidal truncated cylinders at an opposite end, wherein the drive mechanism includes at least one gear wheel adapted to cooperate with a ring gear positioned in a corresponding trapezoidal truncated cylinder, and the drive mechanism includes at least one motor having a stator linked to the inner holding member and a rotor configured to drive in rotation the at least one gear wheel.

10. The robot arm according to claim 9, wherein the rotor has a worm screw configured to drive in rotation the at least one gear wheel.

11. The robot arm according to claim 10, wherein the rotor is connected to a gear reduction device configured to drive in rotation the at least one gear wheel.

12. The robot arm according to claim 11, wherein the inner holding member comprises several cardan joints each positioned between two segments to allow the articulation of the segments relative to each other.

13. The robot arm according to claim 9, wherein the inner holding member comprises several cardan joints each positioned between two segments to allow the articulation of the segments relative to each other.

14. An articulated robot arm, comprising:
a plurality of trapezoidal truncated cylinders disposed in series about an inner holding member, the inner holding member being centrally located in each of the plurality of trapezoidal truncated cylinders and comprising a plurality of segments articulated relative to each other;
a cable extending through the plurality of segments;
a pair of end truncated cylinders located on opposite ends of the plurality of trapezoidal truncated cylinders, each one of the plurality of trapezoidal truncated cylinders having a circular section located on each end with a groove;
a ball located or at least one cylindrical roller located between the grooves of each one of the plurality of trapezoidal truncated cylinders, each one of the plurality of trapezoidal truncated cylinders being configured to pivot about the inner holding member; and
a drive mechanism for each one of the plurality of trapezoidal truncated cylinders, the drive mechanism controls the rotation of each one of the plurality of trapezoidal truncated cylinders about the inner holding member, the drive mechanism being fastened to the inner holding member at one end and operably coupled to an inner surface of a respective one of the plurality of trapezoidal truncated cylinders at an opposite end, wherein the inner holding member comprises several cardan joints each positioned between two segments to allow the articulation of the segments relative to each other.

* * * * *